Patented Oct. 11, 1938

2,132,393

UNITED STATES PATENT OFFICE 2,132,393

SHORTENING AND METHOD OF MAKING SAME

Herbert S. Colth, Albert S. Richardson, and Verling M. Votaw, Wyoming, Ohio, assignors to The Procter & Gamble Company, Cincinnati, Ohio, a corporation of Ohio No Drawing. Application February 4, 1933, Serial No. 655,292

40 Claims. (Cl. 99—123)

Our invention relates to semi-solid or plastic shortenings, such as lard and partially hydrogenated cottonseed oil, which are essentially intimate mixtures of liquid and solid fat. In particular, our invention relates to improved plastic shortenings containing combined glycerin in excess of that occurring in the ordinary triglycerides of fatty acids.

The common commercial shortenings, like the natural fats and fatty oils entering into their composition, are essentially triglycerides, in which fatty acid and glycerin are combined in the ratio of three mols to one mol respectively. No known natural fat contains glycerin in substantially greater amount than one mol to each three mols of total fatty acid. In distinction, synthetic fats are sometimes prepared not only in the form of triglyceride but also in the form of diglyceride and monoglyceride, and various mixtures thereof. Diglycerides contain one mol of combined glycerin to each two mols of fatty acid, and monoglycerides contain glycerin and fatty acid combined in equimolecular proportion. Fats consisting of or containing appreciable proportions of monoglyceride or diglyceride or both are termed superglycerinated fats.

The object of our present invention is to provide superglycerinated fat which is superior for use as shortening not only to the ordinary commercial fats heretofore available but also to superglycerinated fat compounded in accordance with the previous suggestions of others.

It has heretofore been proposed in a general way to add monoglycerides and diglycerides to fatty oils to increase emulsifying power with respect to water. It has also been proposed to make a plastic shortening by stiffening fatty oils by the addition of synthetic hard fat comprising particularly the diglyceride of such fatty acids as palmitic and stearic.

Notwithstanding these proposals, all or practically all commercial edible fats and oils up to the present time have consisted essentially of triglyceride. The failure of edible fats containing monoglyceride and diglyceride to come into practical use may be explained not only by the lack of knowledge of the true advantage of such fats, but also by the fact that in the prior art the specific formulas proposed for superglycerinated fats are defective from the standpoint of realizing this advantage in a practical way.

Our invention will be more clearly understood by referring briefly to matters more fully disclosed in our copending application Serial No. 655,295 filed concurrently herewith. In the making of sweet baked goods such as the usual forms of layer cake, sugar and the water commonly added with it impart to the finished product both desirable and undesirable properties. The resulting sweetness, moistness, and tenderness are highly prized, but these are attained in increasing degree at the expense of volume and light texture. Thus it has been found that an increase in the ratio of the amount of sugar used to that of flour is generally beneficial and improves the moistness and keeping qualities of the cake, but that the amount of sugar which may be used is limited by the increasing tendency of the cake to fall when a predetermined ratio of sugar to flour is exceeded. Under present practice with the use of ordinary shortenings, the amount of sugar in commercial cakes is on the average limited to less than the weight of flour present, notwithstanding the fact that more sugar and along with it more moisture would be advantageous from the standpoint of the desirable qualities of these ingredients. If, for instance, 50% more sugar than flour is used, the cake made with ordinary commercial shortening has a poor texture and is deficient in volume, if not a complete failure, and such a cake is said to be "sad".

On the other hand, cakes made with the use of the superglycerinated shortening described in the present invention may contain as much as 150% or even 175% sugar (on the basis of flour), and the proportion of milk or other liquid constituents may also be increased, without making the cake "sad". The result is a light, tender cake, unusually sweet and moist and resistant to the development of staleness. The cost of the cake made thus with our shortening is at the same time reduced on account of the relatively greater proportion of sugar and moisture present.

While it is our purpose to provide shortening improved particularly for use in sweet baked goods, our shortening also gives improved results with respect to a light, tender texture when it is used in other classes of cooked products, such as waffles, pancakes, and biscuit.

Shortening made according to the present invention may be described broadly as plastic edible fat which contains superglycerinated fat of such a nature that the monoglyceride or diglyceride or mixture of same is without significant stiffening effect. In other words, the plastic condition of our shortening depends essentially on the nature of the ordinary fats entering into its manufacture, and not upon any substantial stiffening effect of the superglycerinated components in the finished product. In fact, we prefer that the monoglyceride and diglyceride portions of our fat should have a softening rather than even a slight stiffening effect on the finished shortening. The superglycerinated fat, depending upon the excess of combined glycerin which it contains, replaces varying proportions of the usual shortening—from 100% down to 2% or even less, usually between 4% and 14%.

We have found that plastic shortenings of the type just described, and more fully disclosed below, are unusually efficient as judged by the quality of baked products made therewith, especially cakes containing more sugar than flour.

Three general methods are in common use for obtaining the balance of solid and liquid fats required to impart the proper plasticity to a finished shortening. The simplest method is merely the selection of a natural fat that happens to be of suitable composition and consistency, e. g., lard or butter fat. A second method, almost equally simple and better suited to positive control, is to blend together two or more fats of varying melting points and consistency for instance in the manufacture of compound, further described below. A third general method is to alter the consistency of a given fat by some treatment that changes the proportion of liquid and solid constituents in the finished shortening. This alteration is usually effected by partially hydrogenating a liquid or very soft fat, thereby decreasing the proportion of liquid fat without by any means making the whole shortening a true solid under the conditions of its manufacture and use. Fats may also be processed to suitable plastic consistency by graining, i. e. by fractional crystallization to remove excess of solid from a hard fat or excess of liquid from a soft fat, but this method of processing is more often used commercially for the purpose of making hard fats or liquid fats rather than plastic fats. Any of these methods may be used alone or in combination for obtaining the triglyceride portion of our shortening.

Thus the main body of our shortenings is made up of any of the plastic shortenings already known. Preferably our shortening is produced in dry form, and conforms in a general way to one of the three types known as compound, lard, or partially hydrogenated vegetable shortening. Our shortening may also be prepared pre-emulsified with water, for instance, in the form of margarine, or in the form of butter containing added superglycerinated fat.

In the practice of our invention in its simplest form, we prepare separately and add to the main body of shortening a smaller quantity of liquid or plastic synthetic fat containing a considerable excess of combined glycerin over that required to form triglyceride. Alternatively the whole or a part of our shortening may be prepared or processed in such a manner as to contain the required excess of glycerin in the form of monoglyceride or diglyceride or a mixture of the two. In any event, the fatty acids combined in this monoglyceride and diglyceride must consist in substantial part, preferably more than half, of the unsaturated type, and are preferably of average molecular weight corresponding to not less than sixteen carbon atoms. For example, animal fats such as lard or beef tallow, unsaturated vegetable oils such as cottonseed, sesame, peanut, palm or soybean oils, and these same oils or marine oils after partial hydrogenation are suitable raw materials for the preparation of the superglycerinated portion of our shortening. Oils of the coconut type, unless blended with larger quantities of fat of the type just mentioned, are not suitable for use in the preparation of the superglycerinated fat, although the natural triglycerides of the coconut type may be used in our shortenings up to the point permitted by the requirement that the shortening as a whole be plastic.

The proportion of superglycerinated fat, or more specifically of monoglyceride and diglyceride, in our total shortening is best defined in terms of the excess of combined glycerin over what would be required to form triglyceride. For example, .04 pound of monoglyceride incorporated along with each pound of total shortening produces a result roughly equivalent to 0.14 pound of diglyceride per pound of total shortening and about the same result may be obtained if, instead of using a concentrated form of superglycerinated fat, the plastic shortening as a whole is prepared in such a way as to contain about 0.6% more combined glycerin than would be present in the corresponding triglyceride.

In the practice of our invention in its preferred form, the quantity of superglycerinated fat used is such that the excess of combined glycerin introduced over that required for triglyceride formation is between 0.3% and 1.5% of the weight of total shortening. However, ordinary plastic shortenings can also be appreciably improved by introducing into their composition larger or smaller quantities of excess combined glycerin, and our invention is not limited strictly to this preferred range.

The method of making monoglyceride or diglyceride does not constitute a part of the present invention. Free fatty acids may be directly combined with glycerin in excess of that required to form triglyceride by various procedures that are either well-known or readily found in the literature, for instance, by simply agitating the mixture at temperatures between 175° C. and 200° C. Likewise glycerin may be combined directly with triglyceride, for instance by agitating the mixture at 225° to 250° C. Preferably we prepare our superglycerinated fat from highly refined fats or oils, processed as triglycerides through the stage of steam deodorization.

The class of shortening known as compound consists essentially of a fatty oil plasticized by the addition of a hard fat. Thus 85–88% refined cottonseed oil mixed with 15–12% of the same oil almost completely hydrogenated, after steam deodorization, chilling and thorough mixing, is one of the best known compound shortenings on the market. Other fatty oils, such as peanut, sunflower, sesame, soybean, and corn oils may be used in the formula of compound shortenings, or these same oils may be hydrogenated to yield a suitable hard fat. Hard animal fat, especially oleostearin, may also be blended with a soft or liquid fat in compound.

It has previously been proposed to substitute for the usual hard fat (which is of course triglyceride) in compound a synthetic fat, the mixed diglyceride of palmitic and stearic acid being specifically recommended for the purpose.

According to the present invention, we prepare an improved compound shortening by blending in the manner just described a fatty oil and a hard fat, preferably of the triglyceride type, and by adding as an extra ingredient predominantly unsaturated superglycerinated fat of little or no plasticizing value with respect to the fatty mixture as a whole. A suitable raw material for preparing the superglycerinated fat is, for instance, a portion of the blended triglycerides forming the main body of compound or of the liquid or soft base used therein, but the superglycerinated fat may also be prepared from numerous other fats or fatty acids conforming to the general requirements already explained. While it will ordinarily be found economical to produce the superglycerinated portion of our shortening in concentrated form, i. e., with a high combined glycerin content, so that about 15% at most will be required in the finished shortening, an alternative method of making compound according to our invention is to combine a larger proportion, even up to 100%, of the soft base, or of the complete blend of triglycerides, or of the fatty acid mixture derived therefrom, with the quantity of glycerin required in the finished product.

For example, we may use as the soft base of our compound refined cottonseed oil, and proceed as follows:

1. A hard fat is made by hydrogenating a portion of the soft base to 10 iodine value.
2. A blend of 15% hard fat (1) and about 85% unhydrogenated soft base is subjected to vacuum steam deodorization.
3. Superglycerinated fat is prepared by saponifying a portion of the deodorized blend (2) with caustic soda, acidulating with sulphuric acid, washing the liberated fatty acids with water, and then combining the fatty acids with one fifth their weight of C. P. glycerin, exposure to air being avoided as much as possible.
4. The deodorized triglyceride mixture (2) and the synthetic fat (3) are mixed in the ratio 9:1, and finished in the usual manner by chilling on a roll and intimately mixing the chilled fat with a small amount of air.

Alkali refining, hydrogenating, steam deodorizing and the other special processing steps referred to above are well-known operations and require no detailed description.

Lard is another important plastic fat which can be greatly improved for use as shortening by the practice of our invention, preferably by mixing ordinary lard and a highly superglycerinated lard in such ratio that the mixture contains between 0.3% and 1.5% more combined glycerin than the original lard. A highly superglycerinated lard containing between 14% and 25% combined glycerin, suitable for mixing with ordinary lard to increase the glycerin content of the latter to the desired ratio, is conveniently made by combining either ordinary lard (already containing about 10.6% glycerin) or the free fatty acids of lard by known means with the desired quantity of glycerin. However, we do not limit our invention to these exact quantities or to the preferred method of applying the invention to lard. An improved shortening may also be made by subjecting the whole of a batch of lard to reaction with glycerin until the required increase in combined glycerin, for example, 0.3% to 1.5%, is obtained.

The superglycerinated fat incorporated in our improved lard may be derived from other than lard fatty acids, for example, from the fatty acids of beef or mutton tallow or of peanut, cottonseed or other vegetable oil, with or without partial hydrogenation.

Other plastic animal fats, such as a soft beef tallow, may be similarly improved for use as shortening by incorporating therewith superglycerinated fat in accordance with the present invention. Our invention is particularly useful as applied to lard and other plastic animal fats which have been alkali refined or steam deodorized, or have received both these treatments.

Our invention is even more useful as applied to plastic shortening of the type variously known as hydrogenated, all hydrogenated, selectively hydrogenated, or partially hydrogenated. This shortening, which we will hereafter refer to as partially hydrogenated, is made from fatty oil, such as refined cottonseed oil, by subjecting all of the oil to hydrogenation, the degree of which is limited so as to produce a fat of plastic consistency. In distinction, shortening of the compound type is a plastic mixture of unhydrogenated fatty oil and practically completely hydrogenated oil or other hard fat.

Partially hydrogenated shortenings, such as cottonseed oil hydrogenated to about 63 to 80 iodine value and partially hydrogenated shortening of plastic texture derived from peanut, sesame, soybean and other unsaturated oils of edible grade, are among the very best of commercially available shortenings, and are much used in making cakes and other baked products on account of good flavor, stability, and desirable consistency. However, the partially hydrogenated plastic shortenings heretofore available are deficient from the standpoint of their capacity for carrying sugar into cakes, and the overcoming of this deficiency is a particularly important application of the present invention.

Our invention may be practiced by adding to a partially hydrogenated shortening, for example, hydrogenated cottonseed oil of 63 to 80 iodine value, a superglycerinated fat made by combining glycerin with the same partially hydrogenated fat or with the fatty acids obtained therefrom. Again we do not limit our invention to this particular source of superglycerinated fat. What has been said in the foregoing regarding variation in the nature and quantity of superglycerinated fat incorporated in our shortening applies also to partially hydrogenated oils. In addition to vegetable oils, marine oils such as whale, pilchard or menhaden oil may be hydrogenated to the degree required for plastic texture and improved by increasing the combined glycerin content as already described.

Likewise plastic shortening of mixed type may be improved by the practice of our invention. Thus we have found an under-hydrogenated vegetable oil, softer and of lower melting point than desired in the finished shortening, when mixed with a small percentage of very hard triglyceride fat and a plastic or liquid superglycerinated fat, yields a product which combines a particularly fine plastic consistency for mixing with unusually high shortening value in baked goods. Such a shortening, which is in a sense of the compound type as well as the partially hydrogenated type, is illustrated hereinafter by Example 8.

Our shortenings are characterized by high emulsifying power toward water, and lend themselves particularly well to the preparation of smooth emulsions containing even several fold more water than fat, but it is usually more convenient to produce and handle the shortening in dry form up to the point of incorporation with flour, etc., in the mixture to be cooked, it being understood that the expression "substantially dry", as applied to a shortening is intended to exclude margarin or any other emulsion of fat with water or aqueous material in which the water contributes an essential property to the shortening.

This emulsifying power is naturally of advantage in the production of margarine, but we do not claim that superglycerinated fat incorporated in our margarine is superior in emulsifying action to other emulsifiers previously used. The utility of our invention as applied to margarine depends, as in the case of our dry shortenings, upon the improved shortening action due to the presence in a plastic fat mixture of a superglycerinated fat of the type described, i. e., liquid or plastic, and preferably derived from a fatty acid mixture consisting of more than 50% of oleic and other unsaturated fatty acids. In keeping with what has been said above, oils of the coconut type are satisfactory for use in the triglyceride portion of the margarine, but the monoglycerides and diglycerides of the coconut type are not suitable for use unless blended with substantial quantities of superglycerinated fat derived from fatty acids of the preferred type already described.

Butter or butter fat may similarly be improved for use as shortening by the practice of our invention. For this purpose superglycerinated butter fat may be used, or some other liquid or plastic superglycerinated fat of the kind already described may be incorporated with our improved butter or butter fat.

We have also found that shortening containing superglycerinated fat is further improved for baking if, in addition to superglycerinated fat, a small quantity of free fatty acid or an equivalent quantity of soap is present, the amount of which is preferably not less than about 0.13% of the total shortening. This is higher than the percentage of free fatty acid found in many shortenings heretofore generally classed as being of best quality for baking purposes. We are able to obtain such excellent results in baked products with the use of 0.25% or less of soap or free fatty acid in our shortening that ordinarily we prefer not to use a larger amount. However, it should be understood that the effectiveness of soap and free fatty acid is greater with higher percentages and, to obtain the maximum volume of the finished baked products, it may be desirable to use 4% or even more of free fatty acid in our shortening. Combinations of free fatty acid and soap are also effective. Any added free fatty acid or soap, of course, should be carefully prepared from fat of strictly edible grade, even though very minute amounts are sufficient to produce substantial results. Free fatty acids having more than 12 carbon atoms per molecule are preferred on account of flavor.

The following are examples of shortening made in accordance with our invention.

*Example 1*

| | Per cent |
|---|---|
| Cottonseed oil | 84 |
| Hydrogenated cottonseed oil of 15 iodine value | 12 |
| Monoglyceride of cottonseed oil | 4 |

*Example 2*

| | Per cent |
|---|---|
| Peanut oil | 25 |
| Cottonseed oil | 50 |
| Hydrogenated cottonseed oil of 15 iodine value | 15 |
| Diglyceride of peanut oil | 10 |

*Example 3*

| | Per cent |
|---|---|
| Sesame oil | 76 |
| Hydrogenated sesame oil of 12 iodine value | 12 |
| Diglyceride of hydrogenated cottonseed oil of 66 iodine value | 12 |

*Example 4*

| | Per cent |
|---|---|
| Cottonseed oil | 83.85 |
| Hydrogenated cottonseed oil of 15 iodine value | 12.0 |
| Monoglyceride of hydrogenated cottonseed oil of 66 iodine value | 4.0 |
| Free fatty acid from hydrogenated cottonseed oil of 66 iodine value | 0.15 |

*Example 5*

| | Per cent |
|---|---|
| Cottonseed oil | 76.8 |
| Hydrogenated cottonseed oil of 15 iodine value | 13.0 |
| Diglyceride of hydrogenated cottonseed oil of 66 iodine value | 10.0 |
| Soap | 0.2 |

*Example 6*

| | Per cent |
|---|---|
| Cottonseed oil hydrogenated to 66 iodine value | 93.85 |
| Free fatty acid from same fat | .15 |
| Monoglyceride of free fatty acid from same fat | 6.0 |

*Example 7*

| | Per cent |
|---|---|
| Soybean oil hydrogenated to 75 iodine value | 88 |
| Diglyceride of cottonseed oil hydrogenated to 60 iodine value | 12 |

*Example 8*

| | Per cent |
|---|---|
| Peanut oil hydrogenated to 80 iodine value | 84 |
| Completely hydrogenated peanut oil | 4 |
| Diglyceride of cottonseed oil of 66 iodine value | 12 |

*Example 9*

| | Per cent |
|---|---|
| Rendered lard with a free fatty acid content of .3% | 94 |
| Monoglyceride of lard | 6 |

*Example 10*

| | Per cent |
|---|---|
| Hydrogenated lard of 55 iodine value | 91.8 |
| Diglyceride of cottonseed oil hydrogenated to 66 iodine value | 8.0 |
| Free fatty acid from lard | .2 |

*Example 11*

| | Per cent |
|---|---|
| Freshly churned margarine | 96 |
| Monoglyceride of peanut oil hydrogenated to 80 iodine value | 4 |

The freshly churned margarine in Example 11 may be made, for instance, with use of a fat mixture consisting of 15% oleostearin, 45% coconut oil, 20% palm kernel oil, and 20% peanut oil. The freshly churned margarine is intimately mixed with the superglycerinated fat, with or without addition of water other than that contained in the regular margarine emulsion.

*Example 12*

Hydrogenated cottonseed oil of about 70 iodine value, after the usual steam deodorization, is mechanically agitated with 10% by weight of glycerine in an atmosphere of nitrogen at atmospheric pressure at about 240° C. for one hour. The reaction mixture is cooled to about 60° C. and settled. The lower glycerin layer is drawn off and reserved for reuse. The superglycerinated fat is filtered with kieselguhr and made plastic by chilling and mixing in the usual manner.

*Example 13*

To the superglycerinated fat made as described in Example 12 (containing normally as made not more than about 0.1% free fatty acid) there is added sufficient free fatty acid prepared from the same fat source to make the total free fatty acid in the finished shortening 0.15%.

In the above examples, the term "monoglyceride" does not necessarily refer to a material exclusively monoglyceride, but includes synthetic fat consisting predominantly of monoglyceride. Likewise the term "diglyceride" is used in a broad sense so as to comprise a synthetic fat in which the diglyceride predominates.

The term "shortening" as employed herein and in the appended claims is used in the normal sense to designate a material employed in the preparation of baked edible products to render the latter short and friable. In the preparation of a bakery mix in accordance with the present invention it is of advantage to employ the shortening in the plastic condition and it will be understood that a shortening described herein as plastic is one having that consistency at the temperature at which the bakery mix will be formed, which ordinarily will be normal temperature.

No claim is made in this application to baked goods made with our improved shortenings, but certain classes of these baked products are described in greater detail and claimed in our copending application Serial No. 655,295, filed concurrently herewith.

Having thus described our invention, what is claimed as new and desired to be secured by Letters Patent is:

1. A process for improving edible plastic triglyceride fat for use in baking which comprises embodying therein synthetic fat of the group consisting of monoglycerides and diglycerides of predominantly unsaturated higher fatty acids, said synthetic fat being without substantial stiffening action on and constituting at least about 4% of the total glyceride mixture.

2. The process claimed in claim 1 in which the plastic triglyceride fat consists of vegetable oil partially hydrogenated prior to embodying the synthetic fat therein.

3. The process claimed in claim 1 in which the plastic triglyceride fat is prepared by hydrogenating cottonseed oil to about 63 to 80 iodine value and subsequently deodorizing same prior to embodying the synthetic fat therein.

4. The process claimed in claim 1 in which the plastic triglyceride fat consists of lard.

5. The process claimed in claim 1 in which the synthetic fat is derived predominantly from fatty acids of molecular formula containing at least 16 carbon atoms.

6. A process for producing plastic shortening which comprises blending deodorized fat consisting of solid and liquid triglycerides together with synthetic predominantly unsaturated fatty glycerides of the group consisting of monoglycerides and diglycerides of higher fatty acids, the proportion of the various glycerides being such as to make the excess of combined glycerin over that required for triglyceride formation not less than .3% of the weight of the whole shortening, said synthetic glycerides constituting at least about 4% of the total glyceride mixture.

7. The process claimed in claim 6 in which the glycerides of the group consisting of monoglycerides and diglycerides are derived from edible fat previously subjected to steam deodorization in the triglyceride form.

8. The process claimed in claim 6 in which the glycerides of the group consisting of monoglycerides and diglycerides are derived from partially hydrogenated and steam deodorized triglyceride fatty oils.

9. The process claimed in claim 6 in which the excess of combined glycerin over that required for triglyceride formation is between .3% and 1.5% of the weight of total shortening.

10. The process of improving previously refined and deodorized edible fat having a substantially lard-like consistency in the range of ordinary room temperatures and consisting essentially of triglycerides of predominantly unsaturated higher fatty acids, which comprises mixing glycerin with the molten fat and heating to a sufficient extent to increase the combined glycerin content of the fat in amount not less than .3% of the total weight of the resulting glycerides.

11. A blended plastic shortening comprising a major proportion of fat consisting of solid and liquid triglycerides and at least about 4% synthetic fat belonging to the group consisting of monoglycerides and diglycerides of predominantly unsaturated higher fatty acids, said synthetic fat being without substantial stiffening effect on the shortening.

12. The shortening claimed in claim 11 in which the main body of the triglyceride fat consists of previously hydrogenated, deodorized fat.

13. The shortening claimed in claim 11 in which the triglyceride portion of the fat consists of hydrogenated, deodorized cottonseed oil of about 63 to 80 iodine value.

14. The shortening claimed in claim 11 to which there is also added a small quantity of a reagent selected from the group consisting of fatty acids and soaps.

15. The shortening claimed in claim 11 in which the synthetic fat is derived predominantly from fatty acids of molecular formula containing one double bond and containing at least 16 carbon atoms.

16. A plastic shortening agent comprising a natural plastic fat and a synthetic glyceride fat of liquid to plastic consistency containing predominantly unsaturated higher fatty acids in combination with an excess of glycerin over that required for triglyceride formation, said excess of combined glycerin being not less than .3% of the weight of total fat.

17. The shortening claimed in claim 16 in which the natural plastic fat is lard.

18. A compound shortening consisting essentially of fatty oil, a sufficient proportion of hard triglyceride fat to make the shortening plastic, and synthetic fat of liquid to plastic consistency containing glycerides of the group consisting of monoglycerides and diglycerides of predominantly unsaturated higher fatty acids in amount sufficient to give the whole shortening between .3% and 1.5% more combined glycerin than required for formation of triglyceride of all the fatty acid present.

19. The shortening claimed in claim 11 in substantially dry form.

20. The shortening claimed in claim 16 in substantially dry form.

21. A plastic shortening agent consisting essentially of a soft hydrogenated triglyceride oil base, a smaller amount of hard triglyceride fat, and a predominantly unsaturated synthetic fat containing higher fatty acids in combination with an excess of glycerin over that required for triglyceride formation, said excess of combined glycerin being not less than about .3% of the total weight of shortening.

22. A process for improving edible plastic triglyceride fat for use in baking which comprises adding to and mixing with the fat a separately formed synthetic fat of the group consisting of monoglycerides and diglycerides of predominantly unsaturated higher fatty acids, said synthetic fat being without substantial stiffening action on and constituting from about 4% to about 14% of the total glyceride mixture.

23. A process for producing substantially dry plastic shortening which comprises blending deodorizing fat consisting of solid and liquid triglycerides together with predominantly unsaturated, separately formed fatty glycerides of the group consisting of monoglycerides and diglycerides of higher fatty acids, the proportion of the various glycerides being such as to make the excess of combined glycerin over that required for triglyceride formation not less than .3% of the weight of the whole shortening.

24. A process for improving, for use in baking, edible triglyceride fat having prior to such improvement the composition of a fat convertible to plastic consistency at ordinary temperature by chilling the molten fat and mixing, which comprises forming therein, by reaction of glycerin with the triglyceride fat, synthetic fat of the group consisting of monoglycerides and diglycerides, said synthetic fat constituting at least 2% of the total glyceride mixture.

25. A process for improving, for use in baking, edible triglyceride fat having prior to such improvement the composition of a fat convertible to plastic consistency at ordinary temperature by chilling the molten fat and mixing, which comprises adding to and mixing with the triglyceride fat a synthetic fat of the group consisting of monoglycerides and diglycerides of predominantly unsaturated higher fatty acids, said synthetic fat being without substantial stiffening action on and constituting at least about 4% of the total glyceride mixture.

26. A process for improving, for use in substantially dry form in baking, edible triglyceride fat having prior to such improvement the composition of a fat convertible to plastic consistency at ordinary temperature by chilling the molten fat and mixing, which comprises embodying therein synthetic fat of the group consisting of monoglycerides and diglycerides of predominantly unsaturated higher fatty acids, said synthetic fat being without substantial stiffening action on and constituting at least 2% of the total glyceride mixture.

27. A process for producing substantially dry plastic shortening which comprises blending deodorized plastic triglyceride fat together with predominantly unsaturated plastic glyceride fat of the group consisting of monoglycerides and diglycerides of higher fatty acids, the proportion of the various glycerides being such as to make the excess of combined glycerin over that required for triglyceride formation not less than .3% of the weight of the whole shortening.

28. A dry shortening for use in sweet baked goods, plastic at the temperature of forming the bakery mix, consisting of an intimate mixture of higher fatty acid triglycerides and synthetic fat belonging to the group consisting of monoglycerides and diglycerides of predominantly unsaturated higher fatty acids, said synthetic fat exerting no substantial stiffening action on the shortening, the quantity of synthetic fat employed being not less than 2% of the weight of the whole shortening and being sufficient, as compared with the same quantity of fat wholly of the triglyceride type, to materially reduce the normal shrinkage at the end of baking of cakes prepared with the shortening and containing more sugar than flour.

29. An edible plastic shortening for use in sweetened edible products baked from a flour base comprising a major proportion of fat consisting of solid and liquid triglycerides and at least 2% synthetic fat belonging to the group consisting of monoglycerides and diglycerides of predominantly unsaturated higher fatty acids, said synthetic fat being without substantial stiffening effect on the shortening and having an excess of combined glycerin over that required for triglyceride formation equal to at least .3% of the weight of fatty glycerides in the shortening.

30. A substantially dry edible plastic shortening for use in sweetened edible products baked from a flour base comprising a major proportion of fat consisting of solid and liquid triglycerides and at least 2% synthetic fat belonging to the group consisting of monoglycerides and diglycerides of predominantly unsaturated higher fatty acids, said synthetic fat being without substantial stiffening effect on the shortening.

31. A process for improving edible plastic triglyceride fat for use in substantially dry form in baking which comprises adding to and mixing with the fat a separately formed synthetic fat of the group consisting of monoglycerides and diglycerides of predominantly unsaturated higher fatty acids, said synthetic fat being without substantial stiffening action on and constituting at least 2% of the total glyceride mixture.

32. The process of improving, for use as a substantially dry shortening, previously refined and deodorized edible fat having a substantially lard-like consistency in the range of ordinary room temperatures and consisting essentially of triglycerides of predominantly unsaturated higher fatty acids, which comprises mixing glycerin with the molten fat and heating to a sufficient extent to increase the combined glycerin content of the fat in amount not less than .3% of the total weight of the resulting glycerides.

33. A substantially dry plastic shortening comprising an intimate mixture of triglyceride fat and at least 2% of a softer fat of liquid to plastic consistency belonging to the group consisting of monoglycerides and diglycerides of higher fatty acids.

34. A plastic shortening for use in baked goods manufacture, for the purpose described, comprising, in intimate admixture with triglyceride fat, at least about 4% synthetic fat belonging to the group consisting of monoglycerides and diglycerides of predominantly unsaturated higher fatty acids, said synthetic fat being without substantial stiffening effect on the shortening.

35. The process of manufacturing shortening which comprises mixing into a plastic mass solid and liquid fat including synthetic glycerides of the group consisting of monoglycerides and diglycerides of higher fatty acids, said synthetic glycerides being derived from predominantly unsaturated higher fatty acids and being present in amount not less than about 4% of the total fat mixture.

36. A process for improving edible plastic triglyceride fat for use in baking which comprises embodying therein synthetic fat of the group consisting of monoglycerides and diglycerides of predominantly unsaturated higher fatty acids, said synthetic fat being without substantial stiffening action on and constituting at least 2% of the total glyceride mixture and containing excess combined glycerin over that required for triglyceride formation in amount not less than .3% of the weight of the whole shortening.

37. A process for producing plastic shortening which comprises blending deodorized fat consisting of solid and liquid triglycerides together with predominantly unsaturated fatty glycerides of the group consisting of monoglycerides and diglycerides of higher fatty acids, the proportion of the various glycerides being such as to make the excess of combined glycerin over that required for triglyceride formation not less than .3% of the weight of the whole shortening.

38. An edible plastic shortening for use in sweetened edible products baked from a flour base comprising a major proportion of fat consisting of solid and liquid triglycerides and from about 4% to about 14% synthetic fat belonging to the group consisting of monoglycerides and diglycerides of predominantly unsaturated higher fatty acids, said synthetic fat being without substantial stiffening effect on the shortening.

39. A process for improving edible plastic triglyceride fat for use in baking which comprises embodying therein synthetic fat of the group consisting of monoglycerides and diglycerides of predominantly unsaturated higher fatty acids, said synthetic fat being without substantial stiffening action on the shortening and constituting a sufficient proportion, not less than 2%, of the total glyceride mixture to effect substantial increase in the volume of cakes prepared with the shortening and from a batter containing much more sugar than flour.

40. A plastic shortening comprising higher fatty acid triglycerides and a separately formed mixture consisting essentially of predominantly unsaturated higher fatty acid monoglycerides and diglycerides, said mixture being without substantial stiffening action on the shortening and constituting a sufficient proportion, not less than 2%, of the total glyceride mixture to effect substantial increase in the volume of cakes prepared with the shortening and from a batter containing much more sugar than flour.

HERBERT S. COITH.
ALBERT S. RICHARDSON.
VERLING M. VOTAW.